United States Patent [19]

Dupont

[11] 4,216,421
[45] Aug. 5, 1980

[54] APPARATUS AND METHOD FOR THE THERMAL SIMULATION OF A CONSTANT LOAD ELECTRIC MOTOR

[75] Inventor: Jean Dupont, Paris, France

[73] Assignee: Compagnie Internationale pour l'Informatique, Paris, France

[21] Appl. No.: 932,634

[22] Filed: Aug. 10, 1978

[30] Foreign Application Priority Data

Aug. 19, 1977 [FR] France .............................. 77 25415

[51] Int. Cl.² ............................................. H02P 3/00
[52] U.S. Cl. .................................... 318/471; 361/25; 318/399
[58] Field of Search ............... 318/399, 471, 472, 473; 361/25

[56] References Cited

U.S. PATENT DOCUMENTS

| | | | |
|---|---|---|---|
| 3,387,182 | 6/1968 | Fourr | 361/103 |
| 3,735,219 | 5/1973 | Kahn et al. | 318/135 |
| 3,808,516 | 4/1974 | Hentschel | 318/471 |
| 3,809,960 | 5/1974 | Jossic | 318/471 |
| 3,860,861 | 1/1975 | Gucker | 361/25 |
| 4,135,217 | 1/1979 | Jacques et al. | 318/653 |

*Primary Examiner*—David Smith, Jr.
*Attorney, Agent, or Firm*—Lowe, King, Price and Becker

[57] ABSTRACT

An indication is derived of the thermal properties of a constant load motor during acceleration and deceleration periods without actually monitoring thermal properties of the motor. The motor is accelerated and/or decelerated in response to command pulses so there is a rotational speed change during the acceleration and deceleration periods. In respnse to the command pulses, the charge on a capacitive means is changed so the charge change is proportional to (1) the change of the motor rotation speed during the periods and (2) the reciprocal of the periods. In response to the charge change there is derived an indication of the thermal properties as a function of the electrical, thermal and mechanical characteristics of the motor.

18 Claims, 1 Drawing Figure

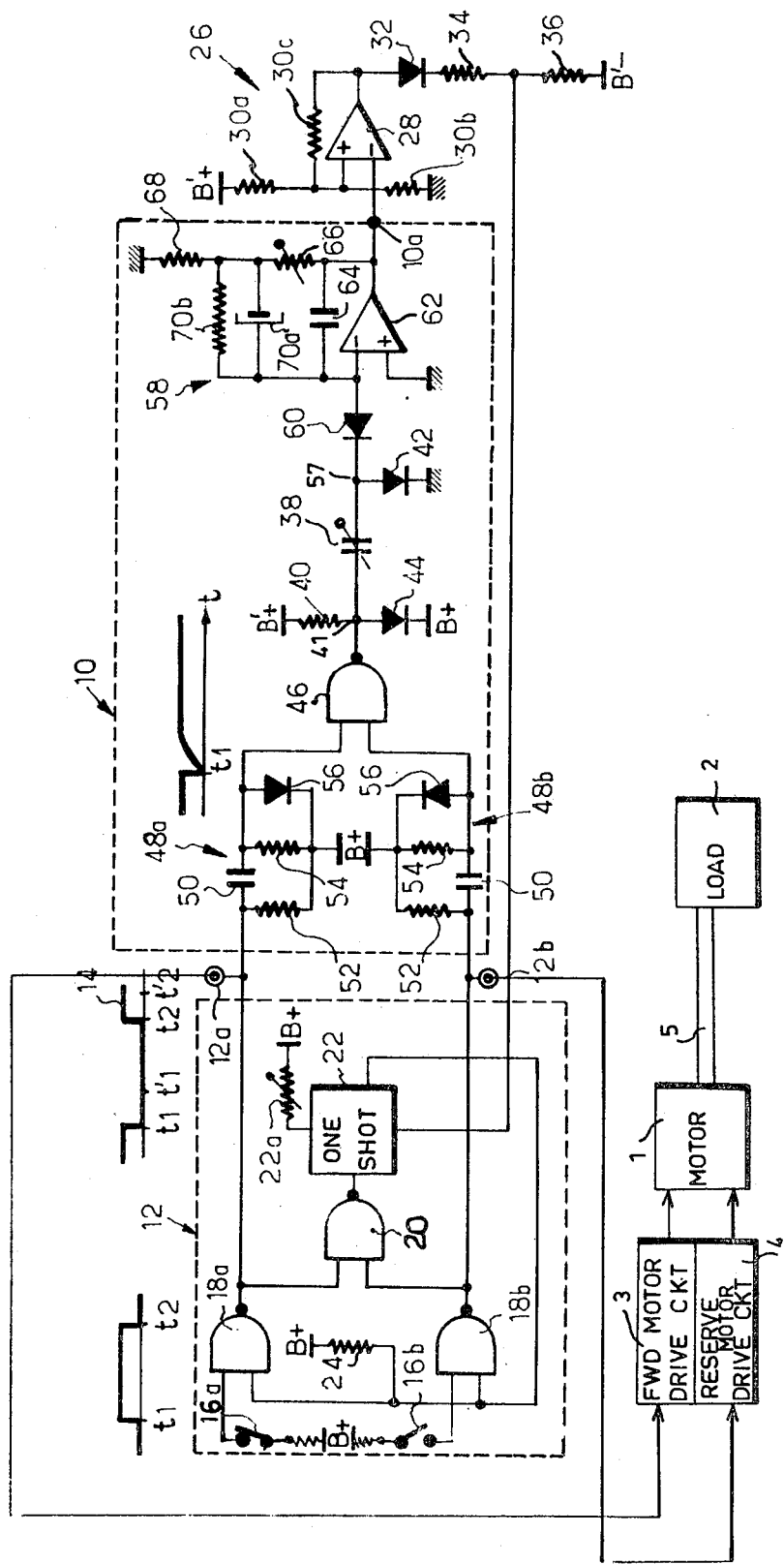

APPARATUS AND METHOD FOR THE THERMAL SIMULATION OF A CONSTANT LOAD ELECTRIC MOTOR

FIELD OF THE INVENTION

The present invention relates to apparatus and method for thermal simulation of a constant load, electric motor and more particularly to a simulation apparatus and method wherein the charge on a capacitor is varied as a function of motor shaft speed.

BACKGROUND OF THE INVENTION

It is known that heating of a constant load, d.c. electric motor cannot be accurately assessed by inserting thermal sensors in it. However, there are special applications in which the causes of motor heating can easily be determined and thus reduced to a formula, having parameters related to the type of motor and method of using it. On the basis of the formula, it is possible at any given time to determine the exact amount of heat produced in the motor. Consequently, rather than inserting thermal sensors in the motor, an electrical circuit which simulates the motor heating in accordance with the appropriate formula is associated with the constant load d.c. motor. Often the electrical value which this circuit supplies for the simulated heating is compared with a given threshold value. When the threshold is reached or exceeded, the motor is stopped until it has cooled sufficiently. The prior art thus includes a wide variety of thermal simulators.

BRIEF DESCRIPTION OF THE INVENTION

In accordance with the present invention the thermal simulation circuit associated with a constant load motor is responsive to actual dynamic motor parameters to simulate the pronounced thermal effects during acceleration and deceleration while ignoring the minimal constant speed thermal effects, during which minimum current flows. During acceleration and deceleration, the motor requires a significant current which can produce deleterious thermal effects. The current is approximately proportional to the difference between motor speeds (V) at the beginning and end of the acceleration and deceleration period and inversely proportional to the period. Because motor heating varies as the square of current amplitude, the heating which occurs during acceleration or starting varies according to the formula $V^2/t_a$, where $t_a$ is the acceleration or starting period. For a complete motor operating cycle (including one start period and one stop period), thermal heating is simulated as $V^2(1/t_a + 1/t_d)$, where $t_d$ is the deceleration or stopping period.

The motor heating also depends on certain characteristics of the motor when it is accelerating or decelerating. It is well known to those skilled in the art that, during acceleration and deceleration, motor heating is proportional to (1) the motor armature circuit electrical resistance ($R_m$), (2) the motor thermal resistance ($R_t$), and (3) the square of the inertia (J) of the motor and the parts it drives, and is inversely proportional to the square of the motor torque constant ($K_t$). The frequency (F) of a motor operating cycle (consisting of one start and one stop), is related to the motor heating (W), $t_a$, $t_d$, $R_m$, $R_t$, J and $K_t$, as well as a motor proportionality constant (C) by:

$$W = C \cdot F \cdot V^2 \cdot \left(\frac{1}{t_a} + \frac{1}{t_d}\right) R_m \cdot R_t \cdot \frac{J^2}{K_t^2} \quad (1)$$

Because of the large number of parameters involved in Equation (1), the thermal effects of the motor can be simulated by many apparatuses that are analogs of the Equation.

The present invention provides an apparatus for thermal, constant load motor simulation which takes into account the heat dissipated during acceleration and deceleration. The apparatus is easy to produce from only a few components.

An apparatus according to the invention for thermal simulation of a constant load electric motor is provided with a command source which supplies command pulses to the motor, whereby the motor operates at a given rotation speed with predetermined starting or acceleration and stopping or deceleration periods. The apparatus responds to each of the command pulses to generate a DC voltage representing the motor temperature. The apparatus comprises capacitive means having a charge that is changed in a manner that is proportional to the square of the rotation speed and the reciprocal of at least one of the start or acceleration periods and stop or deceleration periods. In response to the change in the charge of the capacitive means and a function of the intrinsic electrical, thermal and mechanical characteristics of the motor, a DC voltage that simulates the motor temperature is derived.

Because a simulating arrangement can be designed on the basis of a previously determined function, resulting from calculation or experiment, the apparatus according to the invention preferably relies on Equation (1) by dividing the Equation into three terms F, M1 and M2 as follows:

$$W = F\left[C_1 V^2 \left(\frac{1}{t_a} + \frac{1}{t_d}\right)\right]\left[C_2 \cdot R_m \cdot R_t \cdot \frac{J^2}{K_T^2}\right] \quad (2)$$

where $C_1 \cdot C_2 = C$ and the two bracketed terms respectively define the terms M1 and M2. The capacitive means has a capacitance proportional to term M1 of Equation (2), while a circuit for deriving the DC output voltage in response to the charge change of the capacitive means has a gain proportional to term M2.

It is, accordingly, an object of the present invention to provide a new and improved apparatus and method for determining motor thermal properties without using any heat sensors in the motor.

Another object of the invention is to provide a new and improved apparatus and method for determining motor thermal properties during acceleration and/or deceleration by employing a simulation circuit responsive to dynamic motor parameters.

A further object of the invention is to provide a new and improved apparatus and method for determining motor thermal properties wherein acceleration and/or deceleration effects are simulated in response to indications of motor speed at the beginning and end of the acceleration and/or deceleration periods and the length of the periods.

An additional object of the invention is to provide a new and improved, relatively inexpensive apparatus that accurately simulates motor thermal properties during the primary acceleration and/or deceleration periods.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

The single FIGURE is a partial circuit and partial block diagram of a preferred embodiment.

DETAILED DESCRIPTION OF THE PREFERRED EMBODIMENT

DC motor 1 includes output shaft 5 that drives constant load 2 in forward and reveral directions in response to signals respectively derived from forward motor drive circuit 3 and reverse motor drive circuit 4. To determine the thermal properties of motor 1 during the motor start and stop periods, without using any thermal sensors on the motor, thermal simulator apparatus 10 is provided. Simulator 10, as well as circuits 3 and 4, are responsive to forward and reverse command pulses respectively derived at output terminals 12a and 12b of command source 12. Each of the pulses has a wave form 14 including negative and positive going, leading and trailing edges and represents a command for motor 1 to run. The leading edge, at time t1, of each waveform 14 starts motor 1, while the trailing edge, at time t2, stops the motor.

Apparatus for thermal simulation of motor 1 can only be designed for particular motor operating parameters. In accordance with the present invention, motor 1 operates only under a virtually constant load at a given rotation speed, and with predetermined starting and stopping periods. For example, from the time t1, when the motor start run command signal is derived, the motor actually begins to run at the given speed at time t'1; the motor comes to a complete stop at time t'2, which occurs after the stop command is derived at t2. Hence, there are start up and slow down periods of $t_a=(t1-t'1)$ and $t_d=(t2-t'2)$, respectively. Motor 1 thus turns at the given speed of rotation only during the interval t2-t'1. Motor 1 is controlled in response to circuits 3 and 4 so it operates under these conditions in response to command pulses 14.

Command source 12 comprises two switches 16a, 16b, three NAND gates (also called NOT-AND or NOT-BOTH gates) 18a, 18b and 20, and a variable delay device 22, such as a one shot or monostable multivibrator, having a variable resistor 22a connected to a source of DC operating voltage B+, to adjust the delay duration. Switches 16a and 16b are respectively connected to inputs of NAND gates 18a and 18b and to the B+ source. Gates 18a and 18b have output terminals respectively connected to output terminals 12a and 12b of command source 12, as well as to both input terminals of NAND gate 20, having an output that is applied to an input of delay device 22. Delay device 22 has an output connected a second input of each of NAND gates 18a and 18b; these two inputs of gates 18a and 18b are also connected to the B+ source via resistor 24.

The thermal simulation apparatus 10 derives an output DC simulation voltage at terminal 10a which drives threshold circuit 26. Circuit 26 is triggered when the voltage at output terminal 10a exceeds a predetermined threshold value. Threshold circuit 26 includes a differential amplifier 28 having an inverting input terminal (−) connected directly to output terminal 10a and a non-inverting input terminal (+) connected to a tap between resistors 30a, 30b of a voltage divider connected between a source of DC operating voltage B'+ and ground. The tap is also connected to the output terminal of differential amplifier 28 by a positive feedback resistor 30c. The output of differential amplifier 28 is also connected to a negative DC voltage source, B'−, via diode 32 and series connected resistors 34, 36, having a common terminal connected to a trigger input of delay device 22 in command source 12. The threshold value for circuit 26 is determined by the relative values of resistors 30a and 30b.

Thermal simulation apparatus 10 comprises, in essence, a variable capacitor 38, the capacitance of which is adjusted so it is directly proportional to the predetermined maximum rotational speed of shaft 5. If the maximum rotational speed of motor shaft 5 is not predetermined, it can be measured by a tachometer generator on the shaft; such a tachometer generator 6, supplies a DC voltage directly proportional to shaft speed to a peak detector and hold circuit that activates a capacitor driver, having an output suitable for variable capacitor 38; e.g., the driver output is a voltage if the variable capacitor is a semiconductor varactor or the output is a shaft if the variable capacitor is a set of plates. Capacitor 38 is connected to be charged by DC voltage source B+ via resistor 40 and diode 42. Common terminal 41 of resistor 40 and capacitor 38 are connected via diode 44 to DC voltage source B+, having a value less than that of source B'+; for the particular embodiment illustrated the B' and B sources are respectively of 15 and 5 volts. Common terminal 41 is also connected to the output of a NAND gate 46, having two inputs respectively connected to two output terminals 12a and 12b of command source 12 via pulse generating circuits 48a and 48b. Each of circuits 48a and 48b is fed by source B+ and includes a capacitor 50, two resistors 52, 54, and normally back biased diode 56. Each of capacitors 50 is connected in series between output terminal 12a or 12b of the command source 12 and an input of NAND gate 46. Opposite electrodes of each of capacitors 50 are respectively connected to two resistors 52 and 54, having a common connection to one terminal of source B+. Diodes 56 shunt resistors 54 to limit the voltage at each input of NAND gate 46.

Common terminal 57 for diode 42 and capacitor 38 is coupled to output terminal 10a of thermal simulation apparatus 10 via semi-integrating amplifier 58. In particular, common terminal 57 is connected to the cathode of diode 60, having an anode connected to inverting input terminal (−) of a differential amplifier 62. Differential amplifier 62 has a grounded, non-inverting input terminal (+) and forms a chief component of the semi-integrating amplifier 58. Differential amplifier 62 has an output terminal connected directly to output terminal 10a of thermal simulation apparatus 10. A negative feedback path provided between the output terminal and inverting input of amplifier 62 includes, oscillation preventing, filter capacitor 64, having a high voltage electrode connected to ground via resistor 66 and fixed resistor 68. The common terminal of resistors 66 and 68 is connected to the inverting input terminal of differential amplifier 62 by the parallel combination of capacitor 70a and a resistor 70b.

The two fundamental characteristics of thermal simulation apparatus 10 are: (1) in response to each of the command pulses 14 derived from command source 12, the charge on capacitor 38 is changed so it is proportional to the square of the rotation speed of shaft 5 and proportional to the reciprocal of at least one of the starting and stopping periods $t_d$ and $t_a$, and (2) semi-integrating amplifier 58 reacts, as a function of the intrinsic electrical, thermal and mechanical characteristics of the motor, to the change in the charge in capacitor 38 to cause the DC voltage at terminal 10 to simulate the thermal properties of the motor during start up (acceleration) and shut down (deceleration).

In other words, the capacitance of capacitor 38 is adjusted as a function of the term M1 defined above with reference to Equation (2). Term M1 involves both the starting period $t_a$ and the stopping period $t_d$ when a full command cycle is considered (from time t1 to time t'2 of each pulse). The intrinsic electrical, thermal and mechanical characteristics of the motor are represented by the term M2 of Equation (2). Thus, the gain of semi-integrating amplifier 58 is varied as a function of the term M2, as accomplished by adjusting variable resistor 66. Capacitor 70a and resistor 70b form a delay circuit representing the thermal time-constant of the motor, which is reduced as the motor is more effectively ventilated. In other words, the thermal time constant is reduced as resistor 66 is reduced.

Initially, switches 16a and 16b are open and output terminals 12a and 12b of command source 12 are both at a binary one level. In addition, resistors 54 in generating circuits 48a, 48b supply a binary one level to each input of NAND gate 46, whereby the output of the NAND gate is at the binary zero level. Because of the binary zero output of gate 46, the voltage at terminal 41 is determined by the value of resistor 40, voltages B+ and B'+, and the forward bias drop of diode 44. Thereby, capacitor 38 is initially charged to a predetermined voltage.

At time t1, an operator closes forward running switch 16a, the condition shown in the drawing. A binary one is then applied to an input terminal of NAND gate 18a so the output voltage of gate 18a drops to the binary zero level to activate drive circuit 3, causing motor 1 to drive shaft 5 in the forward direction. The resulting negative going leading edge is differentiated by the combination of resistors 52 and 54 and capacitor 50, whereby a binary zero is fed to one input of NAND gate 46, the output voltage of which increases from a binary zero to a binary one level to discharge capacitor 38. The discharge of capacitor 38 is coupled by diode 60 to semi-integrating amplifier 58 to charge capacitor 70a which is part of the thermal time-constant of motor 1. There is thus a positive-going waveform at output terminal 10a of semi-integrating amplifier 58 to simulate term M2 of Equation (2); i.e. the positive-going waveform simulates the intrinsic electrical, thermal and mechanical characteristics of motor 1. In this way, the DC voltage at output 10a of the thermal simulation arrangement 10 simulates the temperature of motor 1 in accordance with Equation (2).

Circuit 48a drives one of the input terminals for gate 46 to the original binary one state comparatively quickly. As soon as the input of gate 46 reverts to the binary one state, the NAND gate output returns to the binary zero state, whereby capacitor 38 is charged through resistor 40 to a level which is predetermined by resistor 40 and diode 44.

If the operator again closes switch 16a to command the motor to run before capacitor 38 has not fully recovered to its original charge, the capacitor discharge increases to cause a corresponding increase in the DC voltage at output terminal 10a of the apparatus 10. If the operator commands are derived at an excessive rate, the DC simulation voltage at terminal 10a exceeds a predetermined temperature threshold level determined by the voltage dividing ratio of resistors 30a and 30b in the threshold circuit 26. In response to the threshold being exceeded, the output signal of circuit 26 changes to trigger monostable multivibrator delay device 22. The output signal of monostable multivibrator 22 inhibits NAND gates 18a and 18b for a time period which is determined by the value of resistor 22a, which is calculated so the motor has time to "recover".

NAND gate 46, and possibly circuits 48a and 48b for generating the control signals for this gate are used only because the motor is commanded to run both forward and backward. However, if only forward rotation by the motor is simulated, terminal 12a may be connected directly to capacitor 38.

If it is desired to use a control signal generating circuit, such as circuit 48a, the only condition this circuit must meet is that the length of the pulse derived by it exceed the time constant of the charging circuit for capacitor 38.

The DC voltage at output terminal 10a of thermal simulation apparatus 10 provides an accurate indication of the heat dissipated by motor 1 since the simulation relies solely on a change, as a function of the square of the current flowing in the motor. Thereby the DC voltage at terminal 10a may be coupled directly to a DC voltmeter to provide a measure of heat dissipation, of motor 1 rather than to threshold circuit 26.

While there has been described and illustrated one specific embodiment of the invention, it will be clear that variations in the details of the embodiment specifically illustrated and described may be made without departing from the true spirit and scope of the invention as defined in the appended claims.

I claim:

1. Apparatus for the thermal simulation of a constant load electric motor responsive to a command source which supplies command pulses to the motor so the motor operates at a given speed of rotation with predetermined starting and stopping periods, said apparatus being responsive to each of the command pulses to generate a DC voltage for the thermal simulation of the motor and comprising a capacitive means, means responsive to each of the command pulses for changing the charge on the capacitive means so the charge change is proportional to (1) the square of the rotation speed, and (2) the reciprocal of at least one of the starting and stopping periods, and means responsive to the charge change as a function of the intrinsic electrical, thermal and mechanical characteristics of the motor for deriving a DC voltage for thermal simulation of the motor.

2. The apparatus of claim 1 further including means for generating a control pulse in response to at least one edge of each of the command pulses, said last named means connecting the command source to the capacitive means.

3. The apparatus of claim 1 or 2 wherein the means for deriving the motor thermal simulation DC voltage comprises a semi-integrating amplifier.

4. The apparatus of claim 3 wherein the semi-integrating amplifier has a gain proportional to the motor electrical and thermal resistance and to the square of the inertia of the motor and the elements driven by the motor, and inversely proportional to the square of the motor torque constant.

5. The apparatus of claim 4 wherein the semi-integrating amplifier comprises a differential amplifier having a feedback loop including a variable resistor and a circuit representing the motor thermal time constant.

6. The apparatus of claim 5 wherein the circuit representing the motor thermal time constant comprises a capacitor connected in parallel with a resistor.

7. The apparatus of claim 1 further including triggered threshold means responsive to the DC voltage for deriving an indication of excess heating in response to the DC voltage exceeding a predetermined threshold value.

8. The apparatus of claim 7 further including delay means responsive to the indication to delay the application of the command pulses to the motor.

9. In combination, a constant load electric motor, a source of command pulses for selectively accelerating and decelerating the motor during accelerating and decelerating periods, means for connecting the motor to be rotationally driven in response to the pulses, means responsive to the command pulses for simulating thermal properties of the motor so that an indication of the thermal properties can be derived without heat monitoring means in the motor, said thermal simulating means comprising: capacitive means, means responsive to each of the command pulses for changing the charge on the capacitive means so the charge change is proportional to the change of the motor rotation speed during at least one of the periods and the reciprocal of at least one of the periods, and means responsive to the charge change for deriving the indication.

10. The apparatus of claim 9 wherein the means for deriving the indication includes means for simulating intrinsic electrical, thermal and mechanical characteristics of the motor.

11. The apparatus of claims 9 or 10 wherein the charge changing means includes means for generating as control pulse in response to at least one edge of each of the command pulses.

12. A method of deriving an indication of the thermal properties of a constant load motor during acceleration and/or deceleration periods without actually monitoring thermal properties of the motor, the motor being accelerated and/or decelerated in response to command pulses so that there is a rotational speed change during the acceleration and/or deceleration periods, comprising: in response to the command pulses, changing the charge on a capacitive means so the charge change is proportional to the change of the motor rotation speed during at least one of the periods, and responding to the charge change to derive an indication of the thermal properties as a function of the electrical, thermal and mechanical characteristics of the motor.

13. Apparatus for controlling a motor having a fixed load driven at constant, predetermined speed under steady state conditions in response to start and stop commands comprising drive circuit means for the motor responsive to the commands, the motor responding to the drive circuit means so the shaft speed normally takes a predetermined interval to reach the predetermined speed from rest in response to the start commands and a predetermined interval to reach rest from the predetermined speed in response to the stop command, and means responsive to the start and stop commands being derived at an excessive rate for preventing changes in the motor speed until the motor can recover, said last named means including: means for simulating the thermal characteristics of the motor in response to said commands and for deriving a control signal to prevent the speed change in response to excessive simulated temperature, said simulator means including a capacitor having a value proportional to the square of the predetermined speed and inversely proportional to the predetermined intervals, means responsive to each start command for changing the charge on the capacitor at a predetermined rate for a predetermined period, low pass filter means responsive to the charge accumulated by the capacitor, said filter means including means for simulating the thermal time constant of the motor and deriving an output voltage indicative of simulated thermal characteristics of the motor, and threshold detection means responsive to the output voltage to derive the control voltage.

14. The apparatus of claim 13 wherein said filter means includes an operational amplifier having a feedback network including another capacitor shunted by a resistor connected to form a delay circuit representing the motor thermal time constant, and a gain adjusting resistor connected to said amplifier to represent intrinsic electrical, thermal and mechanical characteristics of the motor.

15. The apparatus of claim 14 wherein the capacitor charged in response to the start command is connected in circuit between an input terminal of the amplifier and a fixed DC voltage source, and switching means responsive to the start command for altering the connection between the capacitor charged in response to the start command and the DC voltage source for a predetermined interval in response to the start command, whereby the charge accumulated on the capacitor is a function of the rate at which the start commands occur, said amplifier input terminal being responsive to the capacitor accumulated charge.

16. Apparatus for simulating thermal characteristics of a motor having a fixed load driven at a constant, predetermined speed by the motor shaft under steady state conditions in response to start and stop commands, the motor responding to the start and stop commands so the motor shaft normally takes a predetermined interval to reach the predetermined speed from rest in response to the start command and a predetermined interval to reach a rest state from the predetermined speed in response to the stop command, the simulating apparatus comprising a capacitor having a value proportional to the square of the predetermined speed and inversely proportional to the predetermined intervals, means responsive to each start command for changing the charge on the capacitor at a predetermined rate for a predetermined period, low pass filter means responsive to the charge accumulated by the capacitor, said filter means including means for simulating the thermal time constant of the motor and deriving an output voltage indicative of simulated thermal characteristics of the motor.

17. The apparatus of claim 16 wherein said filter means includes an operational amplifier having a feedback network including another capacitor shunted by a resistor connected to form a delay circuit representing the motor thermal time constant, and a gain adjusting resistor connected to said amplifier to represent intrinsic electrical, thermal and mechanical characteristics of the motor.

18. The apparatus of claim 17 wherein the capacitor charged in response to the start command is connected in circuit between an input terminal of the amplifier and a fixed DC voltage source, and switching means responsive to the start command for altering the connection between the capacitor charged in response to the start command and the DC voltage source for a predetermined interval in response to the start command, whereby the charge accumulated on the capacitor is a function of the rate at which the start commands occur, said amplifier input terminal being responsive to the capacitor accumulated charge.

* * * * *